Oct. 5, 1954  P. C. HOLTE  2,690,918
BALL DETENT PIPE COUPLING OR THE LIKE
Filed Dec. 7, 1953  2 Sheets-Sheet 2

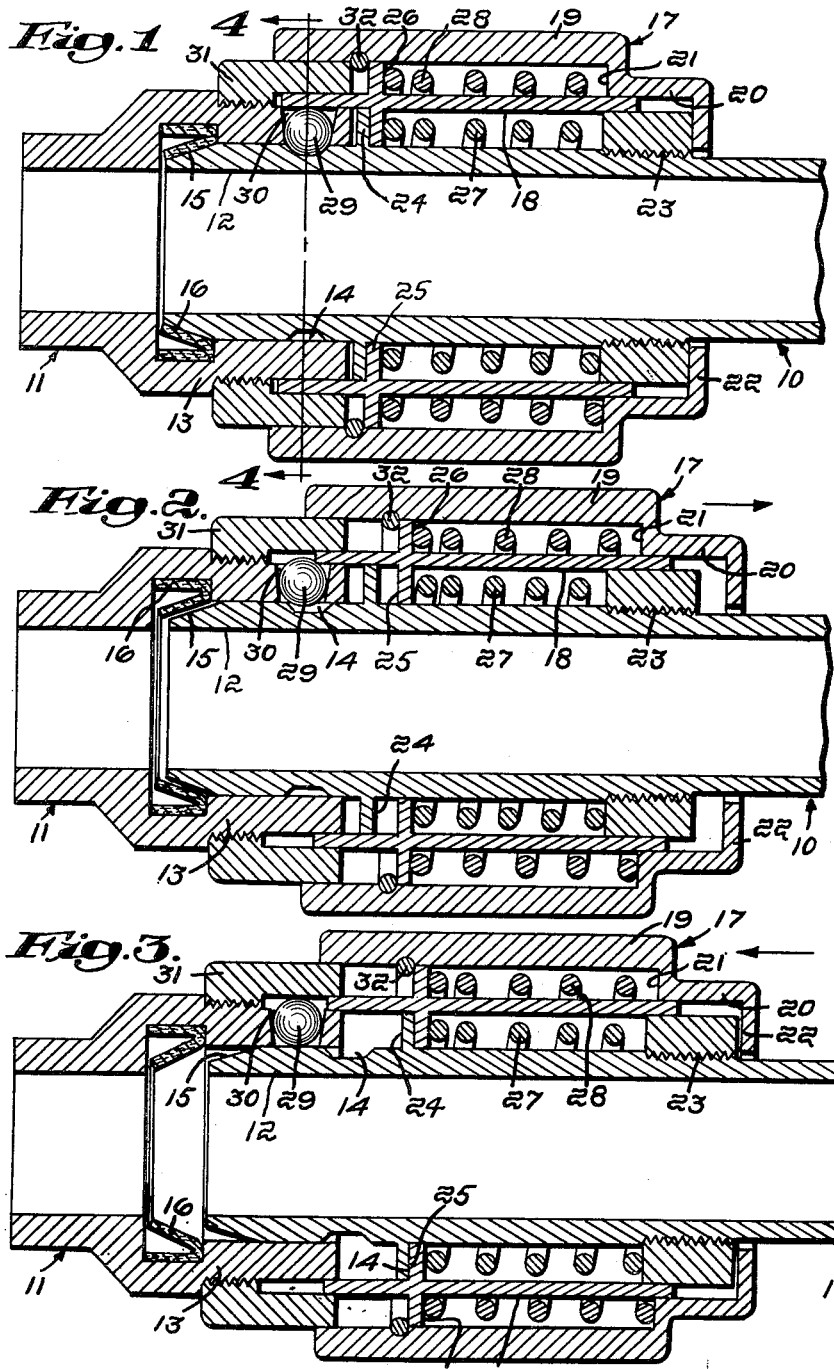

Inventor:
Paul C. Holte,
by Abbott Spear
Attorney

Patented Oct. 5, 1954

2,690,918

UNITED STATES PATENT OFFICE 2,690,918

BALL DETENT PIPE COUPLING OR THE LIKE

Paul C. Holte, Weymouth, Mass., assignor to Pullman Vacuum Cleaner Corporation, Boston, Mass., a corporation of Massachusetts Application December 7, 1953, Serial No. 396,499

5 Claims. (Cl. 285—97.3)

This invention relates to couplings for use in securely interconnecting elements and adapted to be quickly and easily released to enable such elements to be separated. The present application is a continuation of my co-pending application, Serial No. 215,958, filed March 16, 1951, now abandoned.

In my co-pending application, Serial No. 167,765, filed June 13, 1950, now Patent 2,667,371, issued January 26, 1954, I have shown a coupling which is well adapted to a wide variety of uses, of which interconnecting conduit sections are particularly noteworthy, and consists of first and second tubular members. The first member has a head dimensioned to fit freely within the mouth of the second member and has an annular groove. A sleeve, which includes an annular locking flange, is resiliently connected to the first member to slide rearwardly from a position in which its locking flange is operative. The second member has a plurality of locking elements movable from a first position in which they are spaced apart to receive the head into a second position in which they are entrant of the annular groove of the head. When the locking elements enter that groove and the locking flange is in its operative position, the locking flange holds the locking elements securely against movement into their first position to effect a secure coupling between the members while enabling them to be easily pulled apart simply by withdrawing the locking flange from its operative position.

In practise, the locking members are wedged into their first position by the head as it enters the second member and in their first position, the locking members are exposed to be engaged by the locking flange. Thus, as the first and second members are pushed together, the sleeve is readily forced rearwardly until the locking members may enter the annular head groove to enable the resilient connection between the sleeve and the first member to be effective to seat the locking members in that groove and to return the locking flange to its operative position in which the locking members are held seated in the head groove. While the first and second members may be coupled tightly together simply by pushing them together, they can not be pulled apart until the sleeve is manually retracted to position the locking flange inoperatively.

It is essential that the first member be not held by its locking flange in pushing the members together to interconnect them as, in that event, the locking flange is prevented from yielding, on its engagement with the locking elements, to enable the head to suitably enter the second member.

The principal objective of this invention is, accordingly, to provide operating means for such a coupling which will provide a hand grip for use in retracting the locking flange from its operative position and which may also be employed when pushing the members together, without preventing the necessary rearward movement of the locking flange.

In accordance with my present invention, I accomplish that result by providing a coupling comprising a first member including a head having a recess between its ends and a second member including an annular portion dimensioned to receive said head within it. Control means for the coupling are connected to the first member for axial movement relative thereto and include an inner sleeve constituting a locking flange dimensioned to receive the annular portion of the second member within it, an outer sleeve and a resilient connection with the first member yieldably maintaining the locking flange in an operative position and the outer sleeve in a first position. A locking element is carried by the annular portion to be wedged into and held from a recess entering position by the head as it enters therein and, in its inoperative position, it is disposed to engage with said inner sleeve to force it rearwardly against the action of the resilient connection, as the head is inserted, until the locking element may enter the head recess. The resilient connection is then effective to drive the locking flange into its operative position. I provide means between the sleeves operative to connect them as a unit when the outer sleeve is moved rearwardly from its first position to uncouple the members and enabling the locking flange to be moved from its locking position independently of the outer sleeve when held in its first position as the members are pushed together.

In the accompanying drawings, I have shown, as an illustrative embodiment of my invention, a pipe coupling made in accordance therewith, showing these and other of its novel features and advantages.

In the drawings:

Fig. 1 is a longitudinal section of a pipe coupling in accordance with my invention.

Fig. 2 is a similar view illustrating the rearward movement of the outer sleeve to retract the locking flange.

Fig. 3 is another similar view illustrating the interconnection of the members with the outer sleeve held against rearward movement as the members are pushed together.

Figure 4:
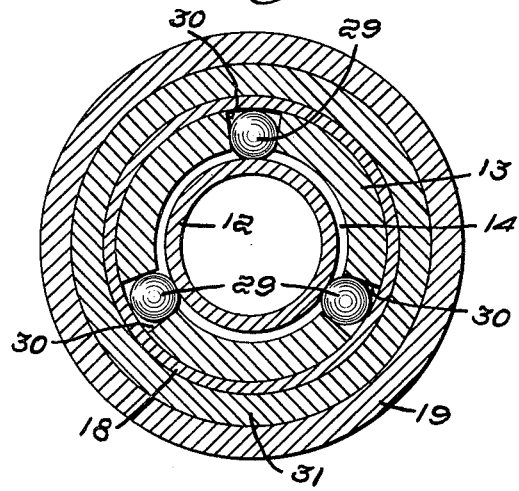
Fig. 4 is a section along the lines 4—4 of Fig. 1.

In the drawings, I have indicated generally at 10 and 11 tubular members as illustrative of two parts of a conduit or a conduit and a tank but obviously the members 10 and 11 may be any two parts which are to be securely coupled together and easily and quickly released.

I provide the member 10 with a head 12 dimensioned to fit freely within the annular portion 13 of the member 11 and having a recess in the form of an annular groove 14 and an inwardly tapering extremity 15 to facilitate its entrance into the annular portion 13. As the coupling shown in the drawings is for fluid tight uses, I have shown the annular portion 13 as being recessed to receive the seal 16 which is shown as being of V-section and disposed to be engaged and compressed by the head extremity 15. The seal 16 is preferably of the type that expands in response to the pressure of the fluid passing through the coupling.

I have indicated generally at 17 the coupling control means. In the embodiment of my invention shown in Figs. 1-4, the control means 17 consists of a inner sleeve 18 and an outer sleeve 19. The outer sleeve 19 constitutes a hand grip and at its rear end 20 is of reduced diameter to establish a shoulder 21 outwardly of the sleeve 18 and end wall 22 engageable with the stop 23 which I have shown as threaded on the member 10 and which has a stop 24 adjacent its head 12. I provide the inner sleeve 18 with a slide establishing an inner shoulder 25 and an outer shoulder 26 and which serves to slidably support the outer sleeve 19. The rear end of this inner sleeve 18 is dimensioned to fit within the part 20 of the sleeve 19 and to be slidably supported by the stop 23. Between the shoulder 25 and the stop 24 is a first spring 27 while a second spring 28 is seated against the shoulder 26 and the shoulder 21 of the outer sleeve 19. The resilient connection between the control means 17 and the member 10 is operative to yieldably maintain the inner sleeve 18 in its operative position and the outer sleeve 19 in its forward or first position.

At 29, I have indicated locking elements which may conveniently be balls mounted in tapered bores 30 in the annular portion 13 of the member 11 to enable the elements 29 to have an inner position, see Fig. 1, in which they may enter the groove 14 and are exposed to be engaged by the head 12 as it is entered into the annular portion 13. When thus engaged, they are forced outwardly into a position in which they are partly exposed exteriorly of the annular portion 13.

The inner sleeve 18 constitutes a locking flange and is dimensioned so that when the elements 29 have entered the groove 14 and the locking flange 18 is in its operative position, the elements 29 are thereby held seated in the groove 14. When, however, the elements 29 are in their outer position, see Fig. 3, they are exposed to engage with the extremity of the locking flange 18. In the embodiments of my invention shown in the drawings, the elements 29 are loosely held in place by a retainer 31 which I have shown as threaded to the annular portion 13 and dimensioned to enter the annular space between the sleeves 18 and 19.

The outer sleeve 19 constitutes the hand grip and in order that it is operative to retract the locking flange 18 when the sleeve 19 is moved rearwardly, see Fig. 2, I provide it with a ring 32 engageable with the shoulder 26 of the locking flange 18 so that the locking flange 18 is moved with it to enable the elements 29 to be released and wedged outwardly so that the members 10 and 11 may be pulled apart.

When the members 10 and 11 are to be interconnected, they may be pushed together. As the members 10 and 11 are pushed together, the head 12 forces the elements 29 outwardly to engage with and force rearwardly the locking flange 18 until they may enter the head groove 14 to enable the locking flange 18 to return under the action of the springs 27 and 28. This action follows even though the outer sleeve 19 is held in its first position, see Fig. 3, as the members 10 and 11 are pushed together, because the locking flange 18 may move rearwardly independently of the outer sleeve 19.

Figure 5:
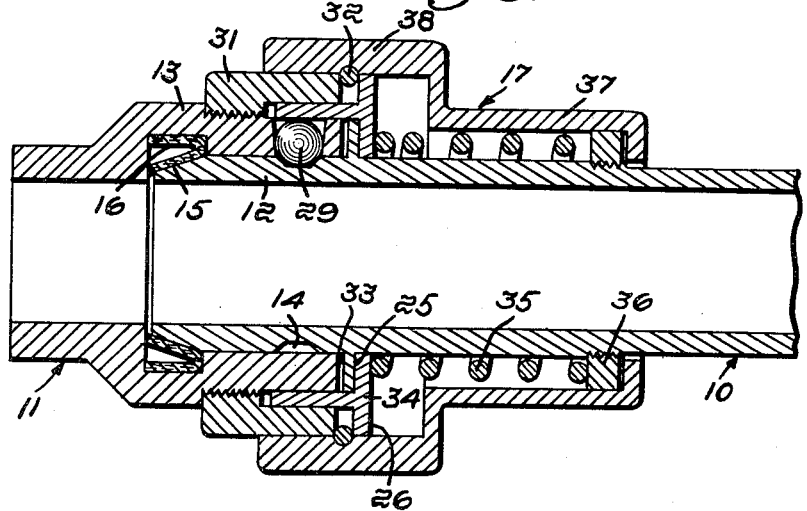
Fig. 5 is a longitudinal section of a modification of my invention.

In the embodiment of my invention shown in Fig. 5, the control means 17, while having the same functions, is shown as having an inner or locking sleeve 33 having a slide 34 establishing the inner and outer shoulders 25 and 26 and serving as a seat for the single spring 35 backed by the stop 36 on the member 10. The rear portion 37 of the outer sleeve 38 is of reduced diameter to have a sliding fit on the stop 36.

In each embodiment of the invention, the end portion of the head 12 is shown as extending beyond the end of the inner sleeve. This is not essential, but is preferred for such purposes as compactness.

From the foregoing, it will be apparent that couplings made in accordance with my invention are well adapted to give satisfactory service in a wide variety of uses since the hand grip employed in unlocking and pulling the members apart may also be used when the members are pushed together to securely interconnect them.

What I therefore claim and desire to secure by Letters Patent is:

1. A coupling comprising a first member including a head having a recess intermediate its ends, a second member including an annular portion dimensioned to receive said head within it, control means for said coupling, said control means being connected to said first member for axial movement relative thereto and including an inner sleeve and an outer sleeve, said inner sleeve constituting a locking flange and being dimensioned to receive said portion within it, a resilient connection between said means and said first member yieldably maintaining said locking flange in an operative position and said outer sleeve in a first position, a detent element carried by said portion to be wedged outwardly and held from a recess entering position by said head as it enters said portion and in its outward position being disposed to engage with said inner sleeve to force it rearwardly against the action of said connection as said head is being inserted in said portion until said elements may enter said head recess, said connection then being effective to drive said locking flange into its operative position, said locking flange being dimensioned to retain said element in said recess in its operative position, and means between said sleeves operative to connect them as a unit when said outer sleeve is moved rearwardly from its first position to uncouple said members and enabling said locking flange to be moved from its locking position independently of said outer sleeve when said outer sleeve is held in its first position as said members are coupled together.

2. A coupling comprising a first member including a head having a recess intermediate its ends, a second member including an annular portion dimensioned to receive said head within it, control means for said coupling, said control means being connected to said first member for axial movement relative thereto and including an inner sleeve slidably supported by said first member and an outer sleeve, slidably supported at least in part by said first sleeve, said inner sleeve constituting a locking flange and being dimensioned to receive said portion within it, a resilient connection between said means and said first member yieldably maintaining said locking flange in an operative position and said outer sleeve in a first position, a detent element carried by said portion to be wedged outwardly and held from a recess entering position by said head as it enters said portion and in its outward position being disposed to engage with said inner sleeve to force it rearwardly against the action of said connection when said head is inserted in said portion until said element may enter said head recess, said connection then being effective to drive said locking flange into its operative position, said locking flange being dimensioned to retain said element in said recess in its operative position, and means between said sleeves operative to connect them as a unit when said outer sleeve is moved rearwardly from its first position to uncouple said members and enabling said locking flange to be moved from its locking position independently of said outer sleeve when said outer sleeve is held in its first position as said members are coupled together.

3. A coupling comprising a first member including a head having a recess intermediate its ends and a pair of axially spaced stops rearwardly of said head, a second member including an annular portion dimensioned to receive said head within it, a first sleeve constituting a locking flange dimensioned to receive said stops and said annular portion within it and including an internal and an external shoulder, said internal shoulder being located between said stops, a spring seated against the rearmost stop and said internal shoulder yieldably urging it against the foremost stop, a second sleeve dimensioned to receive said first sleeve within it and to be slidably supported by said external shoulder and including a rear end wall engageable with said rearmost stop to limit its forward position, a member engageable with said external shoulder to cause rearward movement of said first sleeve with said second sleeve only when said second sleeve is moved rearwardly, and a detent element carried by said portion to be wedged outwardly by said head as it enters therein and in said outward position being disposed to be engaged by said locking flange to force it rearwardly until said element may enter said recess, said locking flange being dimensioned to receive within it said elements when they are seated in said recess.

4. The coupling of claim 3 in which a second spring is seated against the external shoulder of the first sleeve and the end wall of the second sleeve.

5. A coupling comprising a first member including a head having a recess intermediate its ends and a pair of axially spaced stops rearwardly of said head, a second member including a head receiving annular portion, a first sleeve constituting a locking flange dimensioned to receive the foremost stop and said portion within it and including a slide portion establishing an internal shoulder slidably engaging said first member between said stops, a spring seated against the rearmost stop and engaging said internal shoulder to yieldably urge it against the foremost stop, a second sleeve including a first annular part dimensioned to be slidably supported by said external shoulder and a second annular part dimensioned to be slidably supported by said rearmost stop and including an end wall engageable therewith to limit the forward position of said second sleeve, a member carried by said second sleeve engageable with said external shoulder only when said second sleeve is moved rearwardly and when said first sleeve is urged forwardly by said spring, and a detent member carried by said annular portion to be wedged outwardly by said head as it enters therein and in said outward position being disposed to be engaged by said locking flange to force it rearwardly until said detent member may enter said recess, said locking flange being dimensioned to receive within it said detent member when seated in said groove.

No references cited.